3,193,354
MANUFACTURE OF METALLIC SILICIDES AND IN PARTICULAR OF CALCIUM SILICIDE

Maurice Henri Florentin Briault and Serge Crétté, Le Villard, France, assignors to Nobel-Bozel, Paris, France, a joint-stock company of France
No Drawing. Filed Feb. 23, 1962, Ser. No. 175,338
Claims priority, application France, Mar. 1, 1961, 854,291
10 Claims. (Cl. 23—204)

The present invention relates to improvements in the manufacture, in electric furnaces, of metallic silicides.

During the manufacture of these silicides, reductions in yield occur due to the losses which take place at the surface of the electric furnace by the volatilization and carrying away of the silicic and metallic products of reduction.

The present invention has for its object to reduce these losses and in consequence to increase the yields, at the same time facilitating the technical behaviour of an electric furnace and furthermore improving the economic conditions of working.

In accordance with the invention, these objects are attained by introducing into the conventional mixture of the ingredients used in the manufacture of metallic silicides, a compound capable of becoming decomposed at the upper part of the electric furnace, thus absorbing heat and reducing the temperature at the surface of the furnace together with the temperature of the fumes and gases which are given off therefrom.

In a particularly advantageous manner, the compound suitable for that purpose is found to be the carbonate of the metal of which the silicide is to be obtained.

The present invention is especially applicable to the manufacture of calcium silicide.

As is well known, this silicide is obtained under modern methods from calcium carbide, silica and carbon. Heating of these products in an electric furnace results in the following main reaction:

$$CaC_2 + 2SiO_2 + 2C \rightarrow CaSi_2 + 4CO$$

By choosing the most favourable working conditions, there are found on the average in the commercial calcium silicide manufactured, about 90% of the silicon employed and about 80% of the calcium used.

If therefore the present invention is applied in carrying out the manufacture of calcium silicide in an electric furnace, this will involve the addition of calcium carbonate to the conventional mixture of silica, carbon and calcium carbide.

The quantity of calcium carbonate added is such that there is as a minimum 5% by weight of the total calcium in the form of calcium carbonate.

In accordance with other characteristic features:

The calcium carbonate is added to the initial mixture of starting materials to be treated;
The calcium carbonate is mixed with the calcium carbide;
The mixture of calcium carbide and carbonate may comprise up to 50% by weight of the total calcium in the form of carbonate, the most favourable proportion being between 15 and 35%;
According to an alternative method, the calcium carbonate is disposed partly or wholly above the mixture of the other ingredients, at the upper part of the electric furnace.

The advantages and other features of the invention will become more clearly apparent from the description which follows below.

As calcium carbonate, there can be employed any carbonate for the application of the method according to the invention. Thus, it is possible to apply ordinary limestone, chalk, marble, etc. Use will, however, preferably be made of an amorphous natural limestone.

In carrying the method into effect, the limestone is mixed with the other starting materials in the same general way as with the usual ingredients.

According to the nature and the construction of the furnace, it may also be advantageous however to arrange the calcium, partly or even wholly, above the mixture of the other ingredients and at the upper part of the electric furnace.

The size of grain of the calcium carbonate which can be used depends on the granular size of the other ingredients (calcium carbide, silica and carbon), which size depends in turn on the dimensions of the furnace, as is well known. For the limestone, there will preferably be employed a granular size of between 3 and 50 mm.

The technical progress which results from the application of the present invention is considerable:

There is found in the calcium silicide obtained in accordance with the invention, from 95 to 96% of the silicon used at the start and from 85 to 86% of the calcium applied, whereas with known methods the maximum average yields are of the order of 90% for the silicon and 80% for the calcium;

The fumes and the gases evolved from the furnace are liberated at a relatively low temperature, which considerably reduces the deterioration of the movable equipment of the electrodes and in consequence the number of stoppages of the furnace required for repairs. The technical behaviour of the electric furnace is thus facilitated and the economic working conditions of the furnace are greatly improved as compared with those known up to the present time.

The results obtained by the invention are in any event surprising to those skilled in the art.

The mechanics of the reaction will readily be understood when it is observed that the calcium carbonate added according to the invention is decomposed at the upper portion of the electric furnace, following the reaction:

$$CaCO_3 \rightarrow CaO + CO_2$$

This reaction absorbs the quantity of heat required for its completion, which quantity can easily be determined by calculation, taking account of the constants of chemical thermodynamics, which reduces the temperature at the surface of the furnace and also the temperature of the fumes and the gases which are given off therefrom.

The lowering of the temperature at the surface of the furnace can explain the reduction of the losses of the silicon and calcium reduction products by volatilization and carrying away, and in consequence the improvement of the yields in silicon and calcium. The lowering of the temperature of the fumes and gases which are liberated from the furnace explains the improvement referred to for the technical and economic conditions of working of the furnace.

There is given below by way of indication only and without any implied limitation, an example of the application of the method forming the object of the invention.

Example

In an electric furnace of the open arc type, working under a power concentration of the order of 1 kw. per cu.dm., there is charged a mixture having the following percentage composition:

| | Percent |
|---|---|
| Calcium carbide | 17 |
| Limestone | 9 |
| Silica (quartz) | 54 |
| Charcoal | 20 |

After melting the mixture, is it poured off at regular intervals, following a known method.

For 100 kgs. of mixture charged, there is obtained 38.8 kg. of calcium silicide having 62% of silicon and 30% of calicum, which represents a yield of 95.4% for the silicon and 85.8% for the calcium.

It will of course be understood that the present invention has only been described purely by way of explanation and not in any limitative sense, and that any useful modification may be made thereto without thereby exceeding its scope.

We claim:

1. In a method of manufacture of calcium silicide which comprises reacting a basic mixture consisting of calcium carbide, silica and carbon in an electric furnace, the improvment comprising incorporating in said basic mixture calcium carbonate in order to absorb the excess heat, whereby the temperature is lowered at the surface of the furnace together with the temperature of the fumes and gases which are evolved and the losses in volatile products are reduced to a minimum.

2. The improvement as claimed in claim 1, in which the quantity of calcium carbonate incorporated is such that there is as a minimum 5% by weight of the total calcium in the form of calcium carbonate.

3. The improvement as claimed in claim 1, in which the calcium carbonate is mixed with the calcium carbide.

4. The improvement as claimed in claim 3, in which the quantity of calcium carbonate utilized is such that there is as a minimum 5% by weight of the total calcium in the form of calcium carbonate.

5. The improvement as claimed in claim 3, in which the mixture of calcium carbide and carbonate may comprise up to 50% by weight of the total calcium in the form of carbonate.

6. The improvement as claimed in claim 3, in which the mixture of calcium carbide and carbonate comprises between 15 and 35% by weight of the total calcium in the form of carbonate.

7. The improvement as claimed in claim 1, in which the calcium carbonate is disposed partly on top of the mixture of other ingredients and at the upper portion of the electric furnace, the other part being mixed with the basic mixture.

8. The improvement as claimed in claim 1, in which the calcium carbonate is wholly arranged on top of the mixture of other ingredients.

9. The improvement as claimed in claim 1, in which the calcium carbonate is selected from the group consisting of ordinary limestone, chalk, marble, natural amorphous limestone and mixtures thereof.

10. The improvement as claimed in claim 1, in which the size of grain of said calcium carbonate is between 3 mm. and 50 mm.

References Cited by the Examiner

UNITED STATES PATENTS

| 847,267 | 3/07 | Willson | 23—204 X |
| 934,379 | 9/09 | Willson et al. | 23—204 |
| 3,104,939 | 9/63 | Vogt | 23—204 X |

FOREIGN PATENTS

| 187,113 | 1/37 | Switzerland. |

OTHER REFERENCES

Mellov, "Comprehensive Treatise on Inorganic and Themetrical Chemistry," 1925, vol. 6, pp. 182, 189.

MAURICE A. BRINDISI, *Primary Examiner.*